(12) United States Patent
Suorsa et al.

(10) Patent No.: US 7,743,147 B2
(45) Date of Patent: Jun. 22, 2010

(54) AUTOMATED PROVISIONING OF COMPUTING NETWORKS USING A NETWORK DATABASE DATA MODEL

(75) Inventors: Raymond E. Suorsa, Los Gatos, CA (US); Harold Poskanzer, Palo Alto, CA (US); Glenn Ferguson, San Jose, CA (US); Joshua T. LeVasseur, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1804 days.

(21) Appl. No.: 09/838,142

(22) Filed: Apr. 20, 2001

(65) Prior Publication Data

US 2002/0156894 A1 Oct. 24, 2002

(51) Int. Cl.
*G06F 15/173* (2006.01)
(52) U.S. Cl. .................. 709/226; 709/217; 709/218; 709/219; 709/220; 709/221; 709/222; 709/223; 717/168; 717/169; 717/170; 717/171; 717/172; 717/173; 717/174; 717/175; 717/176; 717/177; 717/178
(58) Field of Classification Search ......... 709/217–223, 709/226; 717/168–178
See application file for complete search history.

(56) References Cited

U.S. PATENT DOCUMENTS

| | | |
|---|---|---|
| 5,175,800 A | 12/1992 | Galis |
| 5,249,274 A | 9/1993 | Sztipanovits et al. |
| 5,295,244 A | 3/1994 | Dev |
| 5,650,994 A | 7/1997 | Daley |
| 5,655,081 A | 8/1997 | Bonnell et al. |
| 5,742,829 A | 4/1998 | Davis et al. |
| 5,748,896 A | 5/1998 | Daly |
| 5,752,042 A | 5/1998 | Cole et al. |
| 5,781,703 A | 7/1998 | Desai et al. |
| 5,832,503 A | 11/1998 | Malik et al. |
| 5,835,911 A | 11/1998 | Nakagawa et al. |
| 5,838,907 A | 11/1998 | Hansen |
| 5,870,751 A | 2/1999 | Trotter |
| 5,872,928 A | 2/1999 | Lewis |

(Continued)

FOREIGN PATENT DOCUMENTS

WO   WO9108542 A   6/1991

(Continued)

OTHER PUBLICATIONS

Symborski, C.W.; "Updating software and configuration data in a distributed communications network" Computer Networking Symposium, 1988., Proceedings of the , Apr. 11-13, 1988 pp. 331-338.*

(Continued)

*Primary Examiner*—Dohm Chankong

(57) ABSTRACT

A framework for automatically provisioning computing devices includes a central database system and a central file system. Information stored in the database comprises a model of the individual devices, as well as the interconnections of the devices. The central file system stores the software components to be installed on the devices. When provisioning is carried out, the database sends commands to agents located on each device which cause them to retrieve and install the software components from the file system, and to configure the components according to the stored model.

7 Claims, 7 Drawing Sheets

U.S. PATENT DOCUMENTS

| | | | | |
|---|---|---|---|---|
| 5,920,567 | A | 7/1999 | Saito et al. | |
| 5,944,782 | A | 8/1999 | Noble | |
| 5,996,010 | A | 11/1999 | Leong et al. | |
| 6,009,274 | A | 12/1999 | Fletcher et al. | |
| 6,012,100 | A * | 1/2000 | Frailong et al. | 709/250 |
| 6,021,437 | A | 2/2000 | Chen | |
| 6,023,464 | A | 2/2000 | Woundy | |
| 6,029,196 | A | 2/2000 | Lenz | |
| 6,052,720 | A | 4/2000 | Traversat | |
| 6,067,582 | A * | 5/2000 | Smith et al. | 710/5 |
| 6,088,797 | A | 7/2000 | Rosen | |
| 6,098,097 | A | 8/2000 | Dean | |
| 6,108,420 | A | 8/2000 | Larose | |
| 6,123,737 | A | 9/2000 | Sadowsky | |
| 6,125,388 | A | 9/2000 | Reisman | |
| 6,128,729 | A | 10/2000 | Kimball | |
| 6,134,593 | A | 10/2000 | Alexander | |
| 6,138,153 | A | 10/2000 | Collins, III et al. | |
| 6,167,358 | A | 12/2000 | Othmer et al. | |
| 6,167,567 | A * | 12/2000 | Chiles et al. | 717/173 |
| 6,185,466 | B1 | 2/2001 | Nicewonger | |
| 6,192,354 | B1 | 2/2001 | Bigus | |
| 6,202,206 | B1 | 3/2001 | Dean et al. | |
| 6,226,679 | B1 | 5/2001 | Gupta | |
| 6,226,788 | B1 | 5/2001 | Schoening | |
| 6,243,396 | B1 | 6/2001 | Somers | |
| 6,247,049 | B1 | 6/2001 | Scott | |
| 6,249,883 | B1 | 6/2001 | Cassidy | |
| 6,252,858 | B1 | 6/2001 | Inoue | |
| 6,259,448 | B1 | 7/2001 | McNally | |
| 6,266,335 | B1 | 7/2001 | Bhaskaran | |
| 6,266,809 | B1 * | 7/2001 | Craig et al. | 717/173 |
| 6,286,038 | B1 | 9/2001 | Reichmeyer et al. | |
| 6,286,041 | B1 | 9/2001 | Collins, III | |
| 6,304,549 | B1 | 10/2001 | Srinivasan et al. | |
| 6,304,790 | B1 | 10/2001 | Nakamura | |
| 6,314,565 | B1 | 11/2001 | Kenner | |
| 6,330,586 | B1 | 12/2001 | Yates et al. | |
| 6,345,239 | B1 | 2/2002 | Bowman-Amuah | |
| 6,347,398 | B1 | 2/2002 | Parthasarathy | |
| 6,349,306 | B1 | 2/2002 | Malik | |
| 6,381,628 | B1 | 4/2002 | Hunt | |
| 6,389,126 | B1 | 5/2002 | Bjornberg et al. | |
| 6,389,464 | B1 | 5/2002 | Krishnamurthy | |
| 6,393,386 | B1 | 5/2002 | Zager | |
| 6,396,810 | B1 | 5/2002 | Hebel | |
| 6,411,961 | B1 | 6/2002 | Chen | |
| 6,418,555 | B2 | 7/2002 | Mohammed | |
| 6,421,719 | B1 | 7/2002 | Lewis et al. | |
| 6,463,528 | B1 | 10/2002 | Rajakarunanayake et al. | |
| 6,502,131 | B1 | 12/2002 | Vaid | |
| 6,516,337 | B1 * | 2/2003 | Tripp et al. | 709/202 |
| 6,516,347 | B1 | 2/2003 | Nakamura | |
| 6,535,227 | B1 | 3/2003 | Fox et al. | |
| 6,546,392 | B1 | 4/2003 | Bahlmann | |
| 6,546,553 | B1 | 4/2003 | Hunt | |
| 6,549,944 | B1 | 4/2003 | Weinberg | |
| 6,577,614 | B1 | 6/2003 | Cook et al. | |
| 6,594,723 | B1 * | 7/2003 | Chapman et al. | 711/103 |
| 6,598,090 | B2 | 7/2003 | Champlin | |
| 6,604,238 | B1 * | 8/2003 | Lim et al. | 717/177 |
| 6,618,366 | B1 | 9/2003 | Furukawa | |
| 6,633,907 | B1 | 10/2003 | Spencer | |
| 6,662,221 | B1 | 12/2003 | Gonda et al. | |
| 6,686,838 | B1 * | 2/2004 | Rezvani et al. | 340/506 |
| 6,708,195 | B1 * | 3/2004 | Borman et al. | 718/102 |
| 6,728,748 | B1 | 4/2004 | Mangipudi | |
| 6,732,269 | B1 * | 5/2004 | Baskey et al. | 713/153 |
| 6,738,908 | B1 | 5/2004 | Bonn | |
| 6,754,707 | B2 * | 6/2004 | Richards et al. | 709/227 |
| 6,775,830 | B1 * | 8/2004 | Matsunami et al. | 717/176 |
| 6,801,949 | B1 | 10/2004 | Bruck | |
| 6,802,061 | B1 | 10/2004 | Partovi et al. | |
| 6,816,903 | B1 | 11/2004 | Rakoshitz | |
| 6,816,964 | B1 * | 11/2004 | Suzuki et al. | 713/2 |
| 6,826,604 | B2 | 11/2004 | Yamaguchi | |
| 6,834,389 | B1 | 12/2004 | Glass | |
| 6,880,086 | B2 | 4/2005 | Kidder et al. | |
| 6,983,317 | B1 | 1/2006 | Bishop | |
| 6,986,133 | B2 * | 1/2006 | O'Brien et al. | 717/173 |
| 7,124,289 | B1 | 10/2006 | Suorsa | |
| 2002/0010773 | A1 | 1/2002 | Meleis | |
| 2002/0035501 | A1 | 3/2002 | Handel | |
| 2002/0062334 | A1 | 5/2002 | Chen et al. | |
| 2002/0082818 | A1 | 6/2002 | Ferguson et al. | |
| 2002/0082820 | A1 | 6/2002 | Ferguson et al. | |
| 2002/0082821 | A1 | 6/2002 | Ferguson et al. | |
| 2002/0083146 | A1 | 6/2002 | Ferguson et al. | |
| 2002/0095522 | A1 | 7/2002 | Hayko et al. | |
| 2002/0143904 | A1 | 10/2002 | Bair | |
| 2002/0154751 | A1 | 10/2002 | Thompson et al. | |
| 2002/0194584 | A1 * | 12/2002 | Suorsa et al. | 717/176 |
| 2005/0044544 | A1 | 2/2005 | Slivka et al. | |
| 2007/0037095 | A1 | 2/2007 | Sasa | |

FOREIGN PATENT DOCUMENTS

| | | |
|---|---|---|
| WO | WO9826548 | 6/1998 |
| WO | WO9847057 | 10/1998 |
| WO | WO9853397 | 11/1998 |

OTHER PUBLICATIONS

Jun Xu; Kalbarczyk, Z.; Iyer, R.K.; "Networked Windows NT system field failure data analysis" Dependable Computing, 1999. Proceedings. 1999 Pacific Rim International Symposium on, Dec. 16-17, 1999 pp. 178-185.*

R. Shirey; "Internet Security Glossary" RFC 2828 pp. 1 and 149. May 2000. Retrieved from http://www.faqs.org/ftp/rfc/pdf/rfc2828.txt. pdf on Jun. 1, 2005.*

Gilmore, C.; Kormann, D.; Rubin, A.D.; "Secure remote access to an Internet Web server" Network, IEEE vol. 13, Issue 6, Nov.-Dec. 1999 pp. 31-37.*

Entry for "SSL", Newton's Telecom Dictionary, Harry Newton, Feb. 2002, p. 695.*

Paul Anderson, Towards a High Level Machine Configuration System, Proc. Eighth USENIX Sys. Admin. Conference (LISA), Sep. 19-23, 1994, pp. 19-26, San Diego, CA, USA.

Imazu Hideyo, OMNICONF-Making OS Upgrades and Disk Crash Recovery Easier, Proc. Eighth USENIX Sys. Admin. Conference (LISA), Sep. 19-23, 1994 pp. 27-32, San Diego, CA, USA.

Michael Fisk, Automating the Administration of Heterogeneous LANs, Proc. Tenth USENIX Sys. Admin. Conference (LISA X), Sep. 29-Oct. 4, 1996, pp. 181-186, Chicago, IL, USA.

Dave Winer, XML-RPC Specification, Jun. 15, 1999, available at <http://www.xmlrpc.com/spec>.

David K. Hess et al., A Unix Network Protocol Security Study: Network Information Service, Technical Report, 1992, A&M University, Texas, USA.

"Oracle Intelligent Agent User's Guide", Oracle Corporation.

Aggarwal et al., "A flexible multicast routing protocol for group communication".

Anderson, "Towards a High-Level Machine Configuration System".

Bredin, "Market-based Resource Control for Mobil Agents" 1998.

Perkins, "Mobile IP joins forces with AAA, IEEE".

Pidd et al. "Component-Based Simulation on the Web" Dec. 1999.

Rabinovich et al. "RaDaR: a scalable architecture for a global web hosting service".

Yan, "The SIFT Information Dissemination System" Dec. 1999.

* cited by examiner

| | |
|---|---|
| OS Role | Operating System, Agent |
| APP Role | WebServer, ApplnServer |
| Content Role | HTML, JSP, GIF, JPEG |

AUTOMATED PROVISIONING OF COMPUTING NETWORKS USING A NETWORK DATABASE DATA MODEL

This disclosure claims priority under 35 U.S.C. §120 of application Ser. No. 09/699,329 filed on Oct. 31, 2000, and application Ser. No. 09/699,353 filed on Oct. 31, 2000, which are hereby incorporated by reference in their entireties.

FIELD OF THE INVENTION

The present invention is directed to the provisioning of servers and other computing devices that provide support for sites that are hosted on the Internet, intranets, and other communication networks, and more particularly to a framework that facilitates the automated provisioning of such devices during operations such as the initial deployment of a site, rescaling of the site and/or disaster recovery.

BACKGROUND OF THE INVENTION

The growing popularity and increasing accessibility of the Internet has resulted in its becoming a major source of information, as well as a vehicle for inter-party transactions, in a variety of environments. For instance, a number of different types of entities, such as government agencies, school systems and organized groups, host Internet and/or intranet web sites that provide informational content about themselves and topics related to their interests. Similarly, commercial enterprises employ web sites to disseminate information about their products or services, as well as conduct commercial transactions, such as the buying and selling of goods. To support these activities, each web site requires an infrastructure at one or more centralized locations that are connected to a communications network, such as the Internet. Basically, this infrastructure stores the informational content that is associated with a particular site, and responds to requests from end users at remote locations by transmitting specific portions of this content to the end users. The infrastructure may be responsible for conducting other types of transactions appropriate to the site as well, such as processing orders for merchandise that are submitted by the end users. A significant component of this infrastructure is a web server, namely a computer having software which enables it to receive user requests for information, retrieve that information from the appropriate sources, and provide it to the requestor. Web sites which provide more complex services, such as online ordering, may also include application servers to support these additional functions.

In the case of relatively small entity, the infrastructure to support its web site may be as simple as a single server, or even a portion of a server. Conversely, a large, popular web site that contains a multitude of content and/or that is accessed quite frequently may require numerous web servers to provide the necessary support. Similarly, web sites for commercial entities, via which transactional operations are conducted, may employ multiple application servers to support transactions with a large number of customers at one time. In addition to servers, the infrastructure for a web site typically includes other types of computing devices such as routers, firewalls, load balancers and switches, to provide connectivity, security and efficient operation.

The present invention is particularly directed to the manner in which servers, and other devices necessary to support a web site, are provisioned with the appropriate software necessary for the site. Provisioning includes the installation of the software that is executed by the device to perform the functions assigned to it, and the subsequent configuration of that software to optimize its operation for the given site. Such provisioning initially occurs when the web site is launched, i.e. when one or more servers are connected to an appropriate communications network such as the Internet, and loaded with the programs and data content necessary to provide the services associated with the site. Thereafter, a need for further provisioning may arise, particularly in the case of a successful web site, when additional servers must be added to support an increasing number of requests from end users. In another instance, the provisioning of the servers and other computing devices may be required as part of a disaster recovery operation, for example a sudden interruption in power, an attack by a hacker, or corruption of stored software and/or data.

The provisioning of a server or other device that supports the operation of a web site involves several discrete steps. First, the appropriate operating system software must be loaded onto the device. Thereafter, software applications that are required to support the particular functions or services associated with the site are loaded, such as database software, credit card processing software, order processing software, etc. After they have been loaded, these applications may need to be configured, e.g. their operating parameters are set to specific values, to support the requirements of the particular site and/or optimize their performance for that site. Finally, the content associated with the individual pages of the web site must be loaded, after which further configuration may be required. The order in which these various components are loaded onto the server and configured can be quite critical, to ensure compatibility of the various programs with one another.

In the past, the provisioning of web servers was often carried out manually. In other words, each item of software was individually loaded onto the server and then configured by a person having responsibility for that task. One problem with such an approach is the fact that it consumes a significant amount of time. For a relatively large site that is supported by multiple servers, the provisioning could take several days to be completed, thereby delaying the time before the site can be launched and/or upwardly scaled to accommodate increasing traffic. Another, and perhaps more significant, limitation associated with the manual provisioning of devices is the lack of repeatability in the software configurations. More particularly, whenever manual operations are involved in the installation of software, there is always the possibility of human error, such as the failure to install one of the required components, or the loading of the various items of software in the wrong order. Such errors can result in misoperation or total failure of the web site, and can be extremely time consuming to discover and correct.

In addition, when a configuration adjustment is made on one device to improve its performance, if that change is not recorded by the person making the adjustment, it may not be carried over to subsequent devices of the same type when they are provisioned. This latter problem is particularly acute if a device should experience a failure a considerable period of time after the given device was configured. If the person who was responsible for originally configuring the device is no longer available, e.g. he or she has left the employ of the company hosting the site, it may not be possible to reconstruct the original configuration if it was not recorded at the time it was implemented. The same concerns arise if the site needs to be upwardly scaled by adding more devices of the same type after the employee has left.

To overcome some of the problems associated with the installation of software on multiple computers, various techniques have been developed which permit software to be automatically deployed to the computers with minimum involvement by humans. However, these techniques are limited in the types of environments in which they can be utilized. For example, in an enterprise where all of the users interact with the same legacy applications, a "cookie cutter" type of approach can be used to deploy the software. In this approach, every computer can have the same, standard set of programs, each with the same configuration. Once the software programs and settings have been determined, they can be packaged in a fixed format, sometimes referred to as a "ghost" or "brick", and automatically disseminated to all of the appropriate computers. Thus, whenever a change is made to the standard configuration, it can be easily distributed to all of the users at once. Similarly, if a particular user experiences a failure, for instance due to a computer virus, the standard package can be readily installed on the user's computer, to restore the original functionality.

However, this type of automated deployment is not effective for situations in which computers, such as servers, need to be customized to accommodate the individual requirements of varied users. One example of such a situation is a data center which may house the infrastructure for hundreds of different web sites. The hardware and software requirements for these sites will typically vary among each site. For instance, each site will likely have a different business logic associated with it, i.e. the informational content and services associated with a given site will not be the same as those of any other site supported by that data center. These differences may require a combination of hardware and software which is unlike that of any other site. Similarly, different web site developers may employ different platforms for the sites, thereby necessitating various combinations of operating systems and application programs on the servers of the respective sites. Furthermore, different types of equipment may be utilized for the sites, thereby adding to the complexity of the provisioning process. In some cases, the same site may require a variety of different hardware devices, operating systems and application programs to handle all of the different services provided by that site. For an entity that is responsible for managing the varied infrastructure of these sites, such as a data center operator or a third-party infrastructure utility provider, the known approaches to automated software deployment are not adapted to meet the high degree of customization that prevails in these types of situations. Rather, because of the flexibility that is required to accommodate a different configuration of hardware and/or software for each site, manual provisioning is still being practiced to a large extent, with all of its attendant disadvantages.

It is desirable, therefore, to provide a framework for the automated provisioning of servers and other devices that support various types of network-based services, such as the hosting of an Internet or intranet web site. Such a framework should exhibit sufficient flexibility to accommodate the differing needs of the hosts of such services, while maintaining repeatability, and hence reliability, in the provisioning process.

SUMMARY OF THE INVENTION

In accordance with the present invention, the foregoing objectives are achieved by means of a framework in which an automated provisioning system communicates with agents that are resident on each device that is to be provisioned, such as servers, routers, and other computing devices. The agents have access to the configuration of the device at the highest level of authority, so that they are able to fully manipulate all of the software on the device. To minimize security risks in light of the authority level of the agent, communications between the agents and the provisioning system are authenticated, encrypted and carried out in a point-to-point manner.

The provisioning system includes a central file system which contains all of the software components that need to be installed on the devices. In one embodiment of the invention, these components are classified into different categories, or roles, that relate to the frequency with which they are likely to be updated and/or the set of personnel who are permitted to have access to them. Thus, for example, static data content of a site, which may be updated on a daily or weekly basis, is maintained in a separate role from application programs and operating system software. Each device has a set of roles assigned to it, which determines the function and operation of that device.

The system also includes a central database that contains all information that is relevant to the provisioning of the devices. This information includes the hardware configuration of the devices, the software components that make up the various roles assigned to a device, the configuration settings for those components, and logical information such as IP addresses and the like. Whenever a device is to be automatically provisioned, the relevant information is retrieved from the central database, and used to construct a set of commands that are sent to the remote agents for installing the appropriate software components and otherwise configuring the devices.

The information stored in the central database comprises a model of the individual devices, as well as the interconnections of those devices. Whenever a change is to be made to a device, the change is first recorded in the stored model, rather than being directly implemented on the device itself. These changes are carried out by means of a user interface that enables an operator to test them on the model. Once the changes have been verified to be appropriate, they are then provided from the database to the device, through the agents. By having the configurations of the devices be controlled from the database, rather than directly by operators, repeatability of results is assured for all devices of the same type.

All communications between the central database and the remote agents are preferably carried out by means of a central gateway within the provisioning system. This gateway converts provisioning policies from the user interface and database information into the primitives of messages that are sent to the remote agents. As a result, the agents themselves can be relatively light weight in structure, and need not possess a significant amount of internal functionality to perform the tasks associated with provisioning the devices.

These and other features of the invention are explained in greater detail hereinafter with reference to an exemplary embodiment of the invention illustrated in the accompanying drawings.

DETAILED DESCRIPTION

To facilitate an understanding of the principles of the present invention, it is described hereinafter with reference to its application in the provisioning of devices that support web site operations, such as servers, load balancers, firewalls, and the like. Further in this regard, such description is provided in the context of a data center, which typically accommodates the infrastructure to support a large number of different web sites, each of which may have a different configuration for its infrastructure. It will be appreciated, however, that the implementation of the invention that is described hereinafter is merely exemplary, and that the invention can find practical application in any environment where the automated provisioning of computer resources is desirable. Thus, for example, the principles which underlie the invention can be employed to provision computing devices in the networks of an enterprise, or in any other situation in which there are a sufficient number of computing devices to realize the benefits of automated provisioning.

Figure 1:
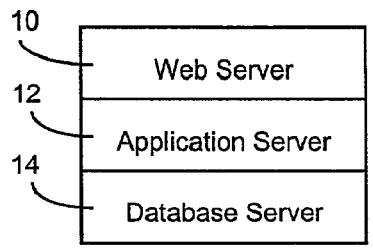
FIG. 1 is a block diagram of the basic logical tiers of a web site.

Prior to discussing the specific features of an exemplary embodiment of the invention, a general overview of the infrastructure for hosting a web site will first be provided. Fundamentally, a web site can be viewed as consisting of three functional tiers. Referring to FIG. 1, one tier comprises a web server tier 10. The web server is the combination of hardware and software which enables browsers at end user locations to communicate with the web site. It performs the task of receiving requests from end users who have connected to the web site, such as HTTP requests and FTP requests, and delivering static or dynamic pages of content in response to these requests. It also handles secure communications through a Secure Socket Layer (SSL), and the generation of cookies that are downloaded to browsers. Typically, since these types of operations do not require a significant amount of processing power, the web server can operate at relatively high volume rates. The throughput capacity of this tier is usually determined by the amount of server memory and disk storage which is dedicated to these operations.

Another tier of the web site comprises an application server tier 12. This component performs dynamic transactions that are much more computationally intensive, such as order processing, credit card verification, etc. Typically, the application server implements the development environment that defines the business logic and presentation layer associated with a given site, i.e. its functionality as well as its "look and feel". The performance of this tier is normally determined by the amount of CPU processing power that is dedicated to it. Separation of the web servers and the application servers into different tiers ensures reliability and scalability.

The third tier of the site comprises a database tier 14. This tier stores information relevant to the operation of the site, such as customer demographic and account information, available stock items, pricing, and the like. Preferably, it is implemented with a relational database architecture, to permit the data to be manipulated in a tabular form. Connection pooling to the database can be performed by the application servers, to minimize redundant calls and thereby preserve processing power.

Figure 2A:
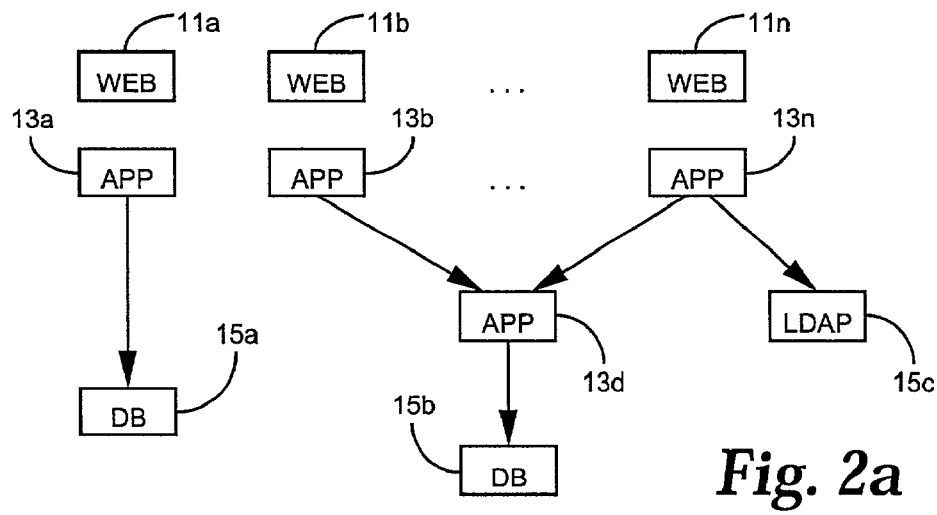
FIGS. 2a and 2b are more detailed diagrams of the devices in an exemplary web site.

While the fundamental architecture of a web site can be viewed as comprising these three tiers, in an actual implementation the structure of the web site can be significantly more complex. Depending upon the size and requirements of the site, in some cases the database tier can be combined into the application server tier. Even more likely, however, is an architecture in which one or more tiers is divided into several layers. This occurrence is particularly true for the application server tier, because it implements the business logic of a site. Depending upon the types of transactions to be performed by the site, the application server tier may require a number of different types of specialized application servers that are interconnected in various ways. One example of such is depicted in FIG. 2*a*. In this situation, the site includes a number of web servers 11*a*, 11*b*, . . . 11*n*. Each of these web servers may have the same software and same configuration parameters. The site also includes a number of application servers 13*a*, 13*b* . . . 13*n*. In this case, however, not all of the application servers are the same. For instance, server 13*a* communicates with a first type of database server 15*a*, whereas servers 13*b* and 13*n* communicate with another application server 13*d* at a different level, which may be a highly specialized server. This server may communicate with a second type of database server 15*b* to carry out the specialized services that it provides. In addition, the server 13*n* may communicate with a directory server 15*c*.

Figure 2B:
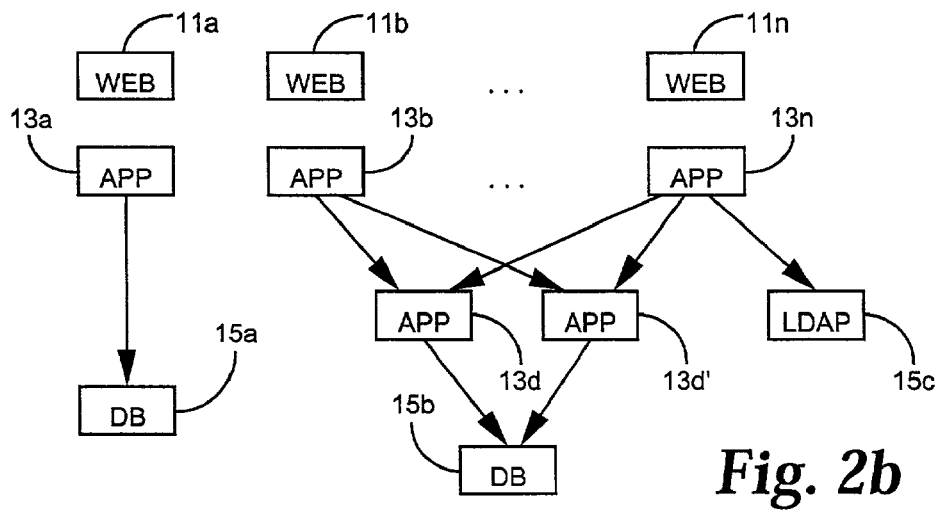

If the performance of the server 13*d* begins to degrade due to increased traffic at the web site, it may be necessary to add another server 13*d'*, to provide additional CPU capacity, as depicted in FIG. 2*b*. However, because of the architecture of the site, the automated provisioning task becomes more complex, since the application server 13*d* is different from the other application servers 13*a*, 13*b*, etc., in both its configuration and its connection to other devices. Hence, not all of the application servers can be treated in the same manner. Furthermore, since the business logic of a given site is likely to be different from that of other sites, the configuration parameters that are employed for the site of FIG. 2*a* may not be appropriate for the devices of any other site, which increases the complexity of the provisioning process even more.

In many instances, the infrastructure for supporting a web site is housed in a data center, which comprises one or more buildings that are filled with hundreds or thousands of servers and associated equipment, for hosting a large number of different web sites. Typically, each floor of the data center contains numerous rows of racks, each of which accommodate a number of servers. In one configuration, each web site may be assigned a portion of a server, or portions of several servers, depending upon its requirements. This approach is typically employed by Internet service providers (ISPs), and is referred to as a "multi-tenancy" configuration, wherein multiple sites may be resident on a given server.

Figure 3:
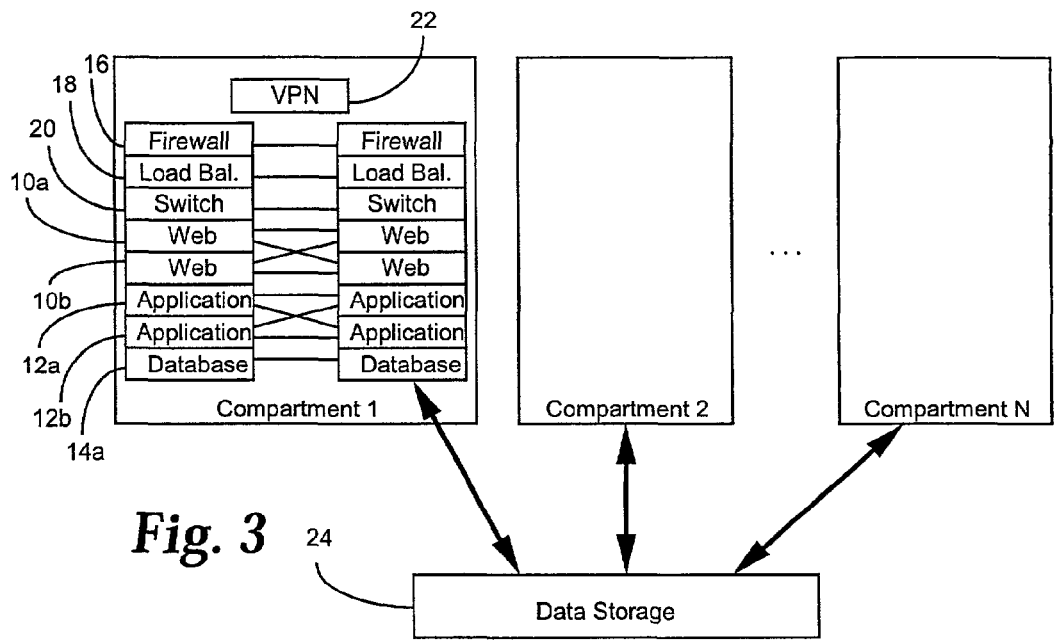
FIG. 3 is a block diagram of one embodiment of the hardware configuration for a web site in a data center.

In an alternate configuration, each site is allocated a discrete compartment within the data center, with the servers and other computing devices within that compartment being dedicated to hosting the services of the given site. FIG. 3 is a block diagram illustrating this latter configuration. This figures illustrates three exemplary web site compartments, each of which accommodates the equipment for hosting a web site. Thus, in the illustrated embodiment, each compartment includes one or more web servers 10*a*, 10*b*, one or more application servers 12*a*, 12*b*, and a database server 14*a*, to provide the three functional tiers. In addition, the components of the web site infrastructure may include a firewall 16 to provide security against attacks on the site, a load balancer 18 for efficient utilization of the web servers and the application servers, and a switch 20 for directing incoming data packets to the appropriate servers. These devices in the web site compartment can be securely connected to the host entity's computer system via a virtual private network 22. To avoid a single point of failure in the web site, additional redundant components are included, and like components are cross-connected with one another. This feature of redundancy and cross-connection adds another layer of complexity to the automated provisioning process, particularly as the web site grows so that the number of devices and their cross-connections increase and become more complicated to manage.

The physical storage devices for storing the data of a web site can also be located in the compartment, and be dedicated to that site. In some cases, however, for purposes of efficiency and scalability, it may be preferable to share the data storage requirements of multiple compartments among one another. For this purpose, a high capacity storage device 24 can be provided external to the individual compartments. When such a configuration is employed, the storage device 24 must be capable of reliably segregating the data associated with one compartment from the data associated with another compartment, so that the different hosts of the web sites cannot obtain access to each others' data. Examples of storage devices which meet these requirements are those provided by EMC Corporation of Hopkinton, Mass. For additional discussion of the manner in which devices of this type can be incorporated into an infrastructure such as that depicted in FIG. 3, reference is made to co-pending, commonly assigned application Ser. No. 09/699,351, filed on Oct. 31, 2000, the disclosure of which is incorporated herein by reference.

Figure 4:
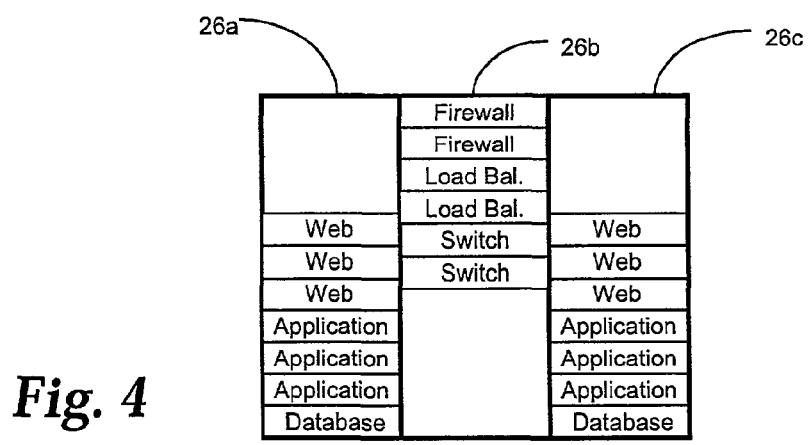
FIG. 4 is a more detailed block diagram of an exemplary configuration for a web site host compartment in a data center.

In a particularly preferred embodiment, each web site compartment is comprised of at least three racks 26 within a data center. Referring to FIG. 4, the two outer racks 26a and 26c contain the components of the three basic tiers for a web site. Thus, each rack may contain one or more webservers and/or application servers. The center rack 26b contains the devices associated with interfacing the web site server to external networks. Hence, the necessary switches, firewalls and load balancers are contained in this rack, where they can be easily connected to the servers in each of the two adjacent racks.

Figure 5:
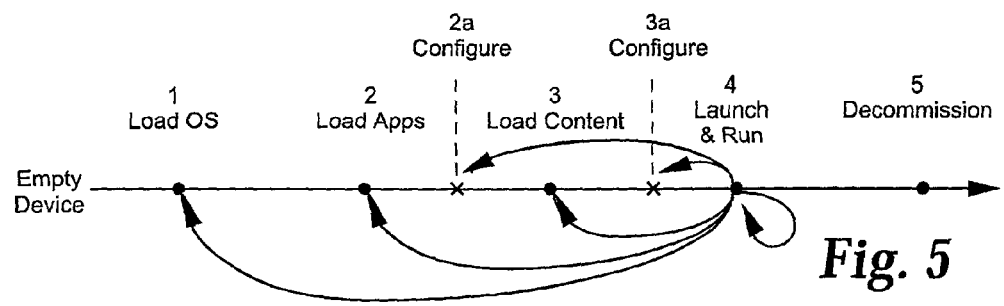
FIG. 5 is a time line illustrating the life cycle of a typical web site server.

To provide the services associated with a web site, each of the servers and other devices in a compartment must be configured with the appropriate software, and then regularly maintained to provide updates consistent with changes in the web site. A typical life cycle for a server is depicted in FIG. 5. Referring thereto, after a server has been constructed it is typically delivered to a data center, or other site where the web site's infrastructure is housed, with only the computer BIOS (Basic Input/Output System) installed on it. When it is to be put into operation, it is assigned to a designated web site compartment, and then customized for the tasks that are to be performed for that site. At the outset, an appropriate operating system and other general software are loaded onto the server at Step 1. If desired, the operating system and general software can be pre-loaded onto the server, before it is assigned to a specific compartment. One technique for preparing servers ahead of time with an operating system and other general software, so that they are ready for assignment to a compartment and immediate loading of site-specific software, is described in co-pending application Ser. No. 09/699,330, filed on Oct. 31, 2000, the disclosure of which is incorporated herein by reference.

The next major step in the customization of the server comprises the loading of the appropriate software applications that will handle the transactions associated with the web site. Examples of such programs include WebLogic application server distributed by Bea Systems, Inc., and Apache Web Server provided by The Apache Software Foundation. Once these types of programs have been installed at Step 2, they typically must be configured, i.e. various operating parameters must be set to appropriate values, which is depicted as Step 2a in FIG. 5. Thereafter, the data content which is specific to the web site is loaded at Step 3, and further configuration may be carried out at Step 3a. Once all of this software has been appropriately installed and configured, the web site is launched and continues to run at Step 4. Even after the launch of the web site, however, continued maintenance of the server is required, to accommodate changes in the content of the site, upgrades to application software, and the like. These maintenance cycles may include the installation of software components, as depicted by the loops which return to Steps 1, 2 and 3 in the life cycle illustration of FIG. 5. In addition, regular configuration changes may need to be made, to increase the performance of the site, as indicated by the loops which return to Steps 2a and 3a.

At the end of its life cycle, the server may be decommissioned at Step 5. This could occur as a result of shutting down the web site, performing a major overhaul of the web site infrastructure, and/or upgrading to new equipment. At this point, the software is removed from the server, whereupon it can be assigned to a new compartment, reloaded with new software appropriate to the existing compartment, or simply retired from use.

One feature of the present invention comprises a system for automating the configuration and maintenance of servers during the entirety of their life cycles, as depicted in FIG. 5. Further in this regard, an objective of the invention is to provide a framework to deploy and configure software on a large number of servers within one or more data centers, that may be associated with different respective web sites, and therefore have different provisioning requirements.

Figure 6:
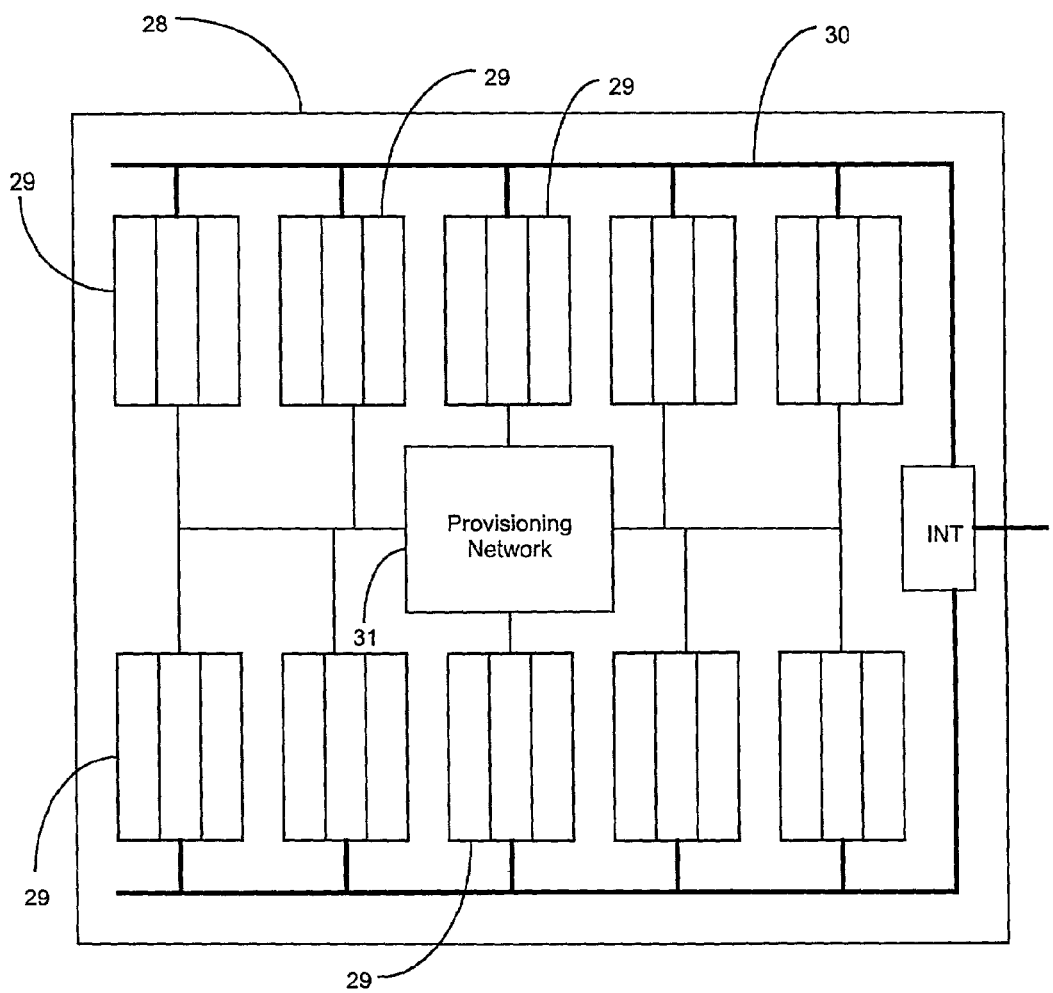
FIG. 6 is a general block diagram of a data center in which the present invention can be implemented.

An overview of one environment in which the present invention operates is depicted in FIG. 6. A data center 28 is partitioned into multiple customer compartments 29, each of which may be arranged as shown in FIG. 4. Each compartment is connected to a backbone 30 or similar type of common communication line for access by computers which are external to the data center. For instance, if the compartments are associated with Internet web sites, the backbone 30 constitutes the physical communication path via which end users access those sites over the Internet. The backbone may also form the path via which the web site hosts can securely communicate with the devices in their individual compartments, for instance by virtual private networks.

Also located in the data center 28 is a provisioning and management network 31. This network may be located within another compartment in the data center. This network is connected to the computing devices in each of the compartments 29 which are to be managed. In the embodiment of FIG. 6, the provisioning network 31 is illustrated as being connected to the compartments 29 by a network which is separate from the backbone 30. In an alternative implementation, the provisioning network can communicate with the compartments over the backbone, using a secure communications protocol.

The provisioning network 31 may be operated by the owner of the data center, or by a third-party infrastructure utility provider. While FIG. 6 illustrates all of the compartments being connected to the network 31, this need not be the case. To this end, multiple provisioning networks may be located in the data center, with each one operated by a separate entity to provision and manage the devices in different ones of the compartments 29. In accordance with the present invention, the network 31 automatically controls the provisioning and management of the computing devices in each compartment associated with that network.

To automate the provisioning of servers and related types of devices in accordance with this aspect of the invention, an agent is installed on each device that is controlled by the network 31, to handle the retrieval and loading of software onto the device. This agent can be installed, for example, during Step 1 in the life cycle of a device, as part of the loading of the operating system and other general software. To be effective in the provisioning of the software, the agent has the ability to manipulate the configuration of the device at the highest level of permission associated with that device. Often, the highest level of permission is denoted as "root access" or "administrator" authority for the device. By providing the agent with such a level of access, it has the flexibility to install, remove and manipulate any software component that resides on the device, including operating system software. In one embodiment of the invention, the agent is written in the Python programming language, since it provides cross-platform capabilities and readily facilitates the manipulation of different types of operating systems.

Figure 7:
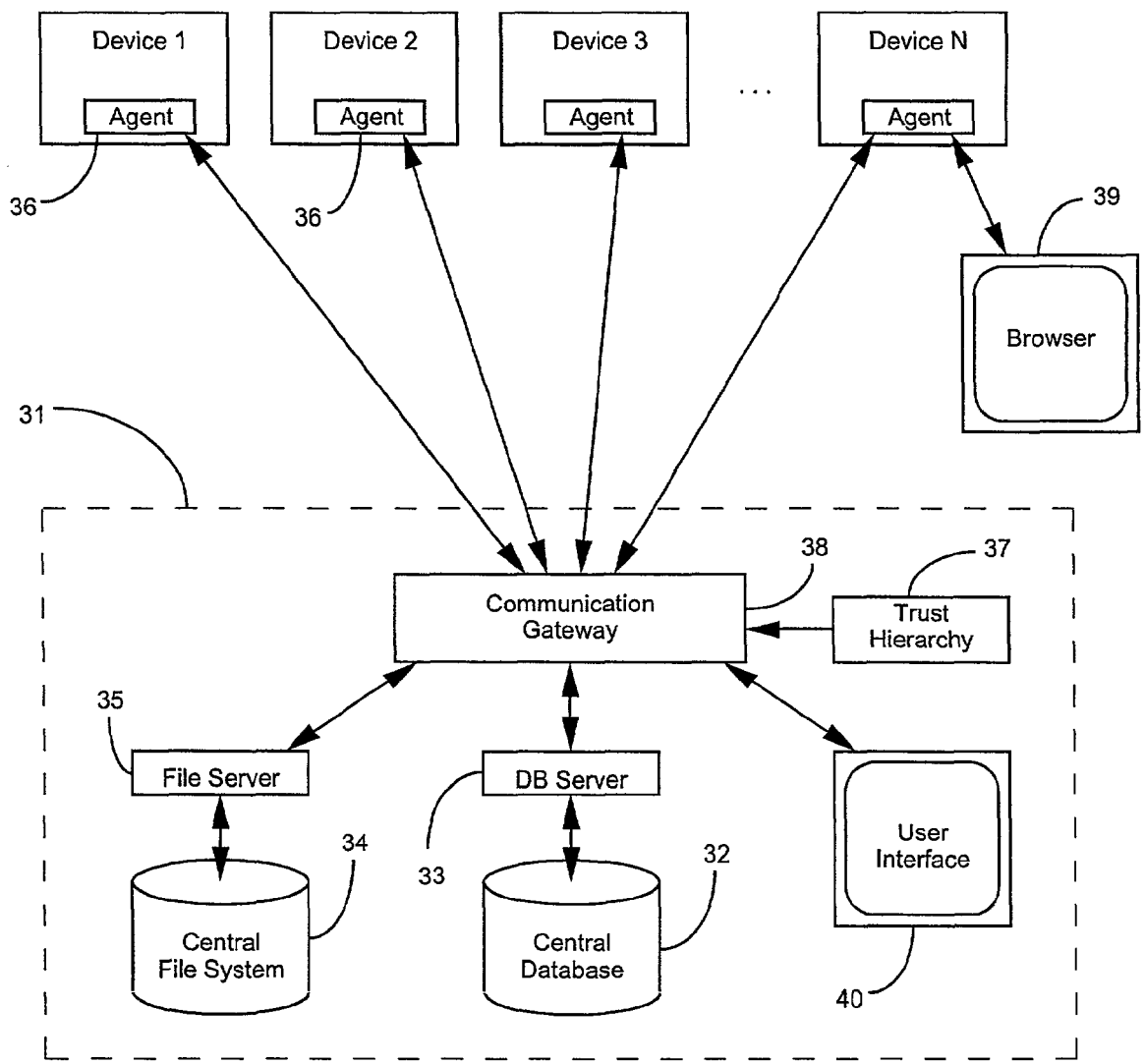
FIG. 7 is a block diagram of a provisioning framework in accordance with the principles of the invention.

The agent communicates with the provisioning network 31 to obtain commands regarding tasks that need to be performed on its device, as well as obtain the software components that are to be installed as part of the provisioning process. One example of a provisioning network 31 that communicates with the agents on individual devices, to perform automated provisioning, is illustrated in FIG. 7. Two fundamental functions are implemented by the provisioning network. One of these functions is to maintain information about, and manage, all of the devices that are associated with the provisioning system. The second function is to store and provide the software that is loaded on these devices. The first function is implemented by means of a central database 32, that is accessed via a database server 33. This database comprises a repository of all pertinent information about each of the devices that are connected to the provisioning network. Hence, depending upon the extent of the provisioning system, the central database might contain information about devices in only a few web site compartments, or an entire data center, or multiple data centers. The information stored in this database comprises all data that is necessary to provision a device. For instance, it can include the hardware configuration of the device, e.g., type of processor, amount of memory, interface cards, and the like, the software components that are installed on the device along with the necessary configuration of each of those components, and logical information regarding the device, such as its IP address, the web site with which it is associated, services that it performs, etc. For a detailed discussion of an exemplary model of such a database for storing all of the relevant information, reference is made to co-pending application Ser. No. 09/699,353, filed on Oct. 31, 2000, the disclosure of which is incorporated herein by reference. In essence, the information stored in the database constitutes a model for each device that is managed by the provisioning system, as well as the interconnection of those devices.

The second principal function of the provisioning network is implemented by means of a central file system 34, which is accessed via a file server 35. This file system stores the software that is to be installed on any of the devices under the control of the provisioning system. To facilitate the retrieval of a given item of software and forwarding it to a destination device, the software components are preferably stored within the file system as packages. One example of a tool that can be used to create software packages for a Linux operating system is the Red Hat Package Manager (RPM). This tool creates packages in a format that enables the contents of a package, e.g. the files which constitute a given program, to be readily determined. It also includes information that enables the integrity of the package to be readily verified and that facilitates the installation of the package. To support a different operating system, a packaging tool appropriate to that operating system, such as Solaris Packages for Sun operating systems or MSI for Microsoft operating systems, can also be employed. Regardless, all packages for all operating systems can be stored in the file system 34.

In operation, when the automated provisioning of a device is to be performed, a command is sent to an agent 36 on the device, instructing it to obtain and install the appropriate software. The particular software components to be installed are determined from data stored in the central database 32, and identified in the form of a Uniform Resource Location (URL), such as the address of a specific package in the file system 34. Upon receiving the address of the appropriate software, the agent 36 communicates with the central file system 34 to retrieve the required packages, and then installs the files in these packages onto its device. The commands that are sent to the agent also instruct it to configure the software in a particular manner after it has been loaded. Commands can also be sent to the agent to instruct it to remove certain software, to configure the network portion of the operating system, or to switch from a static network address to one which is dynamically assigned.

As can be seen, the agent plays a significant role in the automated provisioning process. Since it has access to its device at the root level, communications with the agent need to be secure. More particularly, components of the provisioning system, such as the central database 32 and the file system 34, are located within a trusted provisioning network 31 that is not externally accessible by the Internet, or the like. However, the devices on which the agents 36 are installed must be accessible by external networks via the backbone 30, and therefore are vulnerable to attacks from hackers. To minimize security concerns, therefore, all communications between the individual agents and the provisioning network are conducted on a point-to-point basis, rather than using broadcast messaging, as described in detail hereinafter. Preferably, the communications are encrypted, for example by using a secure protocol, such as HTTPS. Every communication session between a remote agent and a component of the provisioning network can first be authenticated by means of a signed certificate, to confirm to the recipient that the sender of the message is a trusted entity.

To further enhance the security of the communications between the provisioning network and the agents, the network includes a central gateway 38 for communications. For instance, when the provisioning of a device is to be carried out, the gateway can send a message to the agent 36, informing it of a task to be performed, e.g. a package to be retrieved and installed. Upon receiving this task, the remote agent contacts the central file server 35, with the address of the package that is needed. Before releasing the package to the agent, the file server can check with the central database to determine whether the agent should have access rights to that package. Preferably, the communication between the central file server 35 and the database 32 is also carried out via the gateway 38. By having all communications with the central database pass through the gateway, it becomes possible to store a trust hierarchy 37 that is associated with the gateway and that identifies the level of trust to be accorded each device that sends messages. Thus, for example, since the file server is located within the a secure network 31, it can be identified in the trust hierarchy 37 as having a high level of trust. Conversely, since the agents are located outside of the network, they have a less trusted level, and therefore appropriate security measures are taken. For instance, an agent may have the ability to make reports about the configuration of its device, but it cannot request information from the central database relating to its device. Similarly, an agent installed on a device for one web site cannot have access to packages in the file system 34 that are affiliated with another web site. This is enforced by having the file server 35 contact the communication gateway to confirm that an entity which requests access to a particular package has the right to do so. In addition to levels of trust that are associated with various devices and software components, the trust hierarchy can also identify personnel who are authorized to access and/or manipulate the components of the system.

Another advantage associated with the use of the central gateway for communications between the agents and the database is that it permits the agents to be light weight, i.e. to have a relatively simple command set. More particularly, if the agents were to directly communicate with the central database, they would need to have functionality analogous to that of a client in a client-server database system. For instance, if the database utilizes a Structured Query Language (SQL) server, the agents would need to be able to construct SQL queries to send to the database. However, by interposing the gateway as a logic layer between the agents and the database, the necessary functionality for communicating with the database can be contained solely within the gateway, and the communications between the gateway and the agents can be much simpler. For example, messages that are exchanged between the gateway and the agents can be in the form of remote procedure calls that conform to the XML-RPC protocol, or the Simple Object Access Protocol (SOAP). When a message is received at the gateway, it constructs an appropriate SQL query, to retrieve the appropriate information from the database. This information can then be provided to the agents using a higher level messaging protocol, such as XML-RPC or SOAP. An advantage of using such a protocol is that it enables commands to be sent to the agents from the provisioning network 31, which is not possible with SQL statements.

There may be situations in which it is desirable to permit personnel who do not have access to the provisioning system per se to communicate with the agents. For instance, IT personnel at the entity hosting the site may need to perform some types of operations through the agent. In this case, the agent can be given the ability to communicate with a computer 39 external to the network, for instance by means of a browser on that computer. This external access can also serve as a debugging mechanism. For instance, a new configuration can be set up on a device and then tested in isolation on that device, via the browser, before it is deployed to all of the other devices of that same type. Whenever access to a device is sought by an entity outside of the secure network 28, the agent communicates with the gateway 38 to check with the trust hierarchy 37 and first confirm that the entity has the authority to access the device.

Another component of the provisioning system is a user interface 40 by which the devices are managed. The user interface communicates with the gateway 38, which converts messages into the appropriate format. For instance, the gateway can convert SQL data messages from the database 32 into an HTML format for presentation at the user interface. Conversely, the gateway converts procedure calls from the user interface into the appropriate SQL statements to retrieve and or modify data in the database 32. For a detailed description of one technique for performing such a conversion, reference is made to copending application Ser. No. 09/699,349, filed on Oct. 31, 2000, the disclosure of which is incorporated herein by reference.

In essence, the user interface 40 comprises a single point of entry for establishing the policies related to the management of the devices. More particularly, whenever a change is to be implemented in any of the devices, the device is not directly configured by an operator. Rather, through the user interface, the operator first modifies the model for that device which is stored in the database. Once the model has been modified, the changes are then deployed to the agents for each of the individual devices of that type from the data stored in the database, by means of the gateway 38. Preferably, the version history of the model is stored as well, so that if the new model does not turn out to operate properly, the device can be returned to a previous configuration that was known to be functional. The different versions of the model can each be stored as a complete set of data, or more simply as the changes which were made relative to the previous version.

By using a framework such as that shown in FIG. 7 to control the provisioning of the devices from the model data stored in the database, the need to manually configure each device is avoided, and repeatability is ensured, since all devices conform to the stored model. In other words, the model that is stored in the database is the driving force that controls the manner in which the devices are provisioned, rather than manual configuration of individual devices. The gateway 38 functions as the focal point for all communications, and converts the policies established through the user interface into the appropriate primitives to implement the provisioning process, by means of SQL statements to the database and XML-RPC messages to the remote agents. By separating the process considerations entered by management personnel from the basic level operation, these two aspects of provisioning can be individually customized and revised, as desired.

Figures 8, 9:
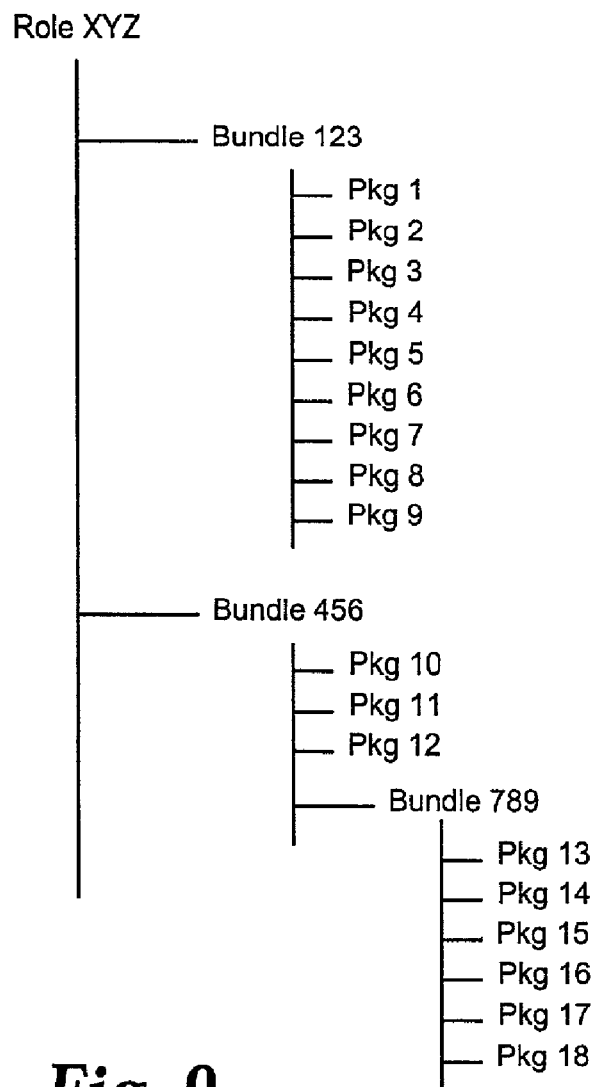
FIG. 8 is a block diagram of the roles for server software.
FIG. 9 is a diagram of the hierarchy of components in a role.

To provide flexibility and further enhance the repeatability of the process, in one implementation of the invention the concept of "roles" is employed to designate the software components to be installed on a device. In one embodiment of the invention, the software components are classified into three types of roles that can be related to the frequency with which those components are likely to change, or be upgraded. Referring to FIG. 8, an OS role comprises the software which has the lowest probability of being changed during the life cycle of a device. This role consists of the operating system for the device, plus other general software. The next type of role, denoted an APP role, consists of software components that also change relatively infrequently, but perhaps more often than the operating system and the general software. This role comprises the application software that is assigned to a device, in accordance with the tasks that are to be performed by that device. Hence, the programs associated with the web server tier and the application server tier are contained in this role. The third type of role, denoted a Content role, consists of the software that can change on a regular basis for web site, such as HTML pages, Java server pages (JSP), image files, and other static content that is regularly updated by the web site host.

A given role comprises a hierarchical structure of specific software components. Referring to FIG. 9, a package comprises one or more files of a software component. A group of related packages forms a bundle. For example, a bundle may comprise all of the packages that constitute the files of a given program. A bundle can include another bundle as one of its components, as illustrated for the case of Bundle 456, which includes Bundle 789. A role, in turn, comprises multiple bundles, as well as the order in which those bundles are to be installed on a device. Within the database 32, the information about each role can be stored as a list of the packages contained within that role, in the order in which installation is to occur.

Each device, therefore, is assigned three roles, namely an OS role, an APP role and a Content role. If one of the tiers of a site needs to be scaled up by adding another server, the required device can be easily built by obtaining the appropriate OS role, APP role and Content role from the model information stored about that type of device in the database 32. Once the operating system and agent have been loaded onto a server, it can be connected to the provisioning network 31 and the software packages associated with each of the APP and Content roles are retrieved from the file system 34, and provided to the agent 36, for installation and configuration on the device, to complete the provisioning.

This approach enhances the flexibility of the automated provisioning process, since each device to be provisioned is easily defined by its assigned roles, and hence different devices can be provisioned with different software, while the overall process remains the same. It also ensures repeatability, since all devices which are assigned the same roles will have the same software components. Furthermore, by partitioning the software for a device into different roles, each role can be upgraded separately from the other roles. Thus, as the content of a web site is changed, the packages for that role can be upgraded, without affecting the packages of the other roles, or impacting upon the provisioning process.

The definition of the roles to be assigned to a device and stored in the database 32 is carried out through the user interface 40. The different roles can be associated with different access rights, to thereby affect their ability to be manipulated. For instance, members of an IT department at the web site host may require access to their Content roles, so that they can regularly update the site. However, access to the OS roles may be limited to certain personnel at the data center or other entity which manages the web site infrastructure. The access rights associated with the different roles can be stored in the trust hierarchy 37.

Although the foregoing example has been provided with reference to three types of roles, it will be appreciated that a greater number of roles can be employed to provide finer gradations between the different types of software on a device. Similarly, it may be preferable to utilize a greater number of roles if more than three different levels of access are set forth in the trust hierarchy for the software components.

When provisioning is to be carried out on a device, the commands to perform this operation are provided to the agent 36 for the device by means of a command queue. Each queue comprises a set of commands that are to be run by the agent 36 in a specific order. The commands may be individually designated via the user interface 40, or be a predefined script that is stored in the database 32 and called up via the user interface. The command queue is stored in the database 32 to provide persistence, so that in the event the gateway should experience a failure while a series of commands is being carried out, the queue will still exist when the gateway is restored to an operational state. While a command queue is being executed, the gateway keeps track of its state in the database, i.e. which command was the last one to be sent to the agent, so that it can easily return to that command if a failure occurs.

Figure 10:
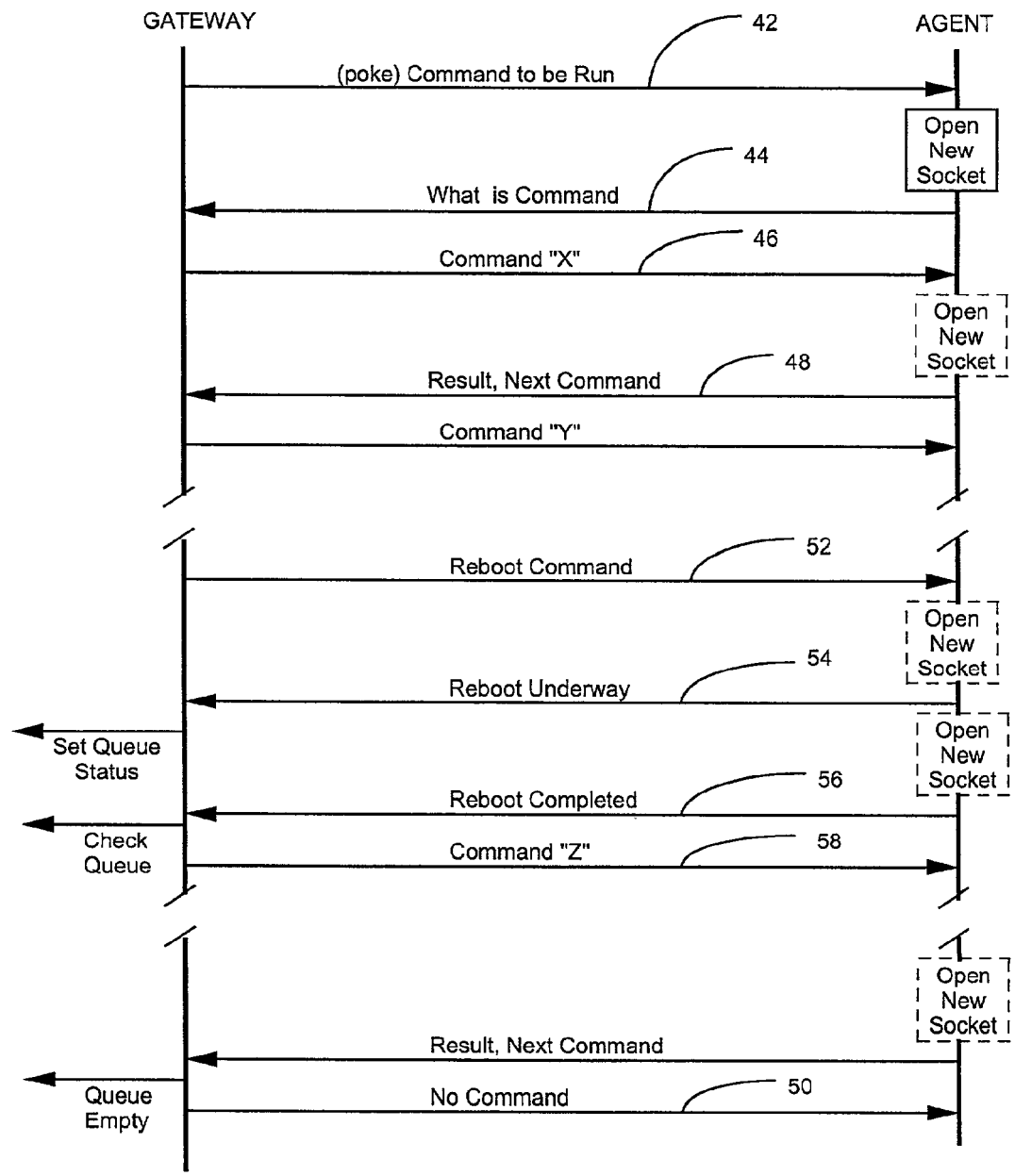
FIG. 10 is a timing diagram that illustrates the communication between the gateway and an agent.

The commands are executed via interaction between the gateway 38 and the agent. Referring to FIG. 10, once a command queue has been created, the execution of the commands begins with a poke message 42 from the gateway to the agent, informing the agent that there is a command to be run. The agent opens a new connection to the gateway and returns a response 44 through this connection, inquiring about the command. By requiring the agent to open a new connection, i.e. a different secure socket, and request the command from the gateway, the possibility of spoofing is decreased. Specifically, if a spoofer should attempt to send an agent a rogue command, the agent will respond to the gateway with a request for a command. If there is no legitimate command to be run by that agent, the gateway simply responds with "No Command", and the agent returns to its prior state.

Thus, the present invention provides a technique whereby the validity of a message or a command transmitted to an agent may be verified. This verification, in accordance with an embodiment of the present invention may be accomplished using a lightweight directory access protocol (LDAP). Additionally, in accordance with an embodiment of the present invention, the access level of the agent may be verified by the system by way of a convenient communications protocol, such as LDAP or the like.

Upon receiving the inquiry from the agent in response to a poke message, the gateway retrieves the first command in the queue, and provides it to the agent in a message 46, e.g. get and install a package at a designated address, such as a file locator address, in the file system. The agent runs the command, and then reports back to the gateway with a result 48. Alternatively, the gateway may provide the agent with the file locator address of the install packages to be installed in response to a command from the queue, which may be presented, for example in the form of a uniform resource locator (URL). If it takes some time to execute the command, the report message may be by means of a new socket, to prevent an open interface between the agent and the gateway. The report also includes an inquiry as to the next command to be executed. If there is another command in the queue, it is retrieved by the gateway and forwarded to the agent, e.g. configure the files that were just installed with designated parameter values. The process continues in this manner, until the end of the queue is reached, at which time the gateway responds to the agent's most recent inquiry with a message 50 that there is no command to be executed. At this point, the procedure ends.

One of the commands 52 that can be sent to the agent is to reboot its device. In response to receipt of this command, the agent sends a result message 54 which informs the gateway that it is rebooting. The gateway does not respond to this message, but places the command queue in a reboot status. Upon rebooting, the agent sends a message 56 to the gateway to inform it that it has just rebooted. In response, the gateway checks the command queue and, if there are commands remaining to be executed, sends the next command 58 in the queue to the agent.

The agent 36 can include functionality for determining the hardware and/or software configuration of the device on which it resides. This feature is useful in identifying discrepancies between the data stored in the database 32 regarding the model for the intended configuration of the device, and the actual configuration of the device. The results of the configuration assessment performed by the agent can be reported to the gateway each time the agent reboots. Alternatively, or in addition, these results can be automatically provided on a regular basis by the agent, e.g. every few hours, as part of a reporting mechanism which enables the gateway to monitor the continued operation of all of the devices. When the results are returned to the gateway, they can be compared with the model stored in the database 32, and any differences reported to the user interface 40, so that they can be appropriately noted and corrected, if necessary.

One type of action that can be taken when a difference is noted is to apply the changes to the model. As described previously, it is possible to reconfigure a device separately from the model, by means of an external browser 39, or the like. When a change is made to a device in this manner, it will be detected the next time that the agent provides a report on its device. Based on an earlier request for authorization that was received from the agent, the gateway is aware of the person who initiated the changes. If this person is recognized as one who has authority to make system-wide changes, the changes that were made to the device can be applied to the model. Thereafter, these changes are disseminated to all of the other devices which have the same roles as the one which was changed.

In accordance with an embodiment of the present invention, locking devices may be employed to ensure that the agents are not overburdened. This may be accomplished, for example, by way of an agent queue locking device implemented on the network gateway, which stores a device identification number. By way of this locking device, the gateway is prevented from attempting to send a second command queue to the device that is currently busy, whose identification number is stored by the locking device, and prevents the system from attempting to execute a second queue on that device until the device is not busy and the locking signal has been removed for the device.

Additionally, a second type of locking device may be used. This second locking device may identify an agent queue by way of an identification number. By way of this second locking device, only a single queue may be executed by a particular agent at any given time. Thus, the network is prevented from attempting to require an agent to accomplish more than one task at a single time.

In practice, when an agent is used to execute commands on a device, a series of steps wherein the agent queries the system database are required. The agent may obtain information from the system database by way of the data model of the database, which is described in copending application Ser. No. 09/699,353, which is incorporated by reference above, and which is directed to "A Data Model for Automated Server Configuration," ("Data Model Application"). In the above-referenced Data Model Application, several tables containing data relating to variables contained within the database are set forth. The agent queries these tables, which will be referred to according to their numbering in the data model application, in order to extract required information, and interact in a useful manner with the network system.

One illustrative example in which the agents interact with the data model is when the agents perform the task of installing software on a hardware device. In accordance with an embodiment of the invention, the agent may reside on the hardware device upon which software is to be installed. Such a scenario is illustrated in FIG. 7, which will be referred to in connection with the tables in the Data Model Application for ease of understanding.

A user, by way of the user interface 40 may indicate a desire for software to be installed on a device, such as Device 1. Upon such an indication, the communication gateway 38 sends a message to the agent 36 indicating that it has a command for the agent 36 to execute on the Device 1. The agent, in accordance with the present invention, then replies to the communication gateway 38 and asks for the command to be executed, which may be a device role, for example. In response, the communication gateway 38 transmits the device role for the Device 1 to the agent 36. The device role comprises a series of software packages or units to be installed on the Device 1.

Once the agent 36 has received the device role, it queries the communication gateway 38 regarding the specific software units or packages associated with the device role. The communication gateway 38 in turn queries the data model described in the Data Model Application regarding the software packages or units associated with the device role received by the agent 36.

The variables associated with the device role communicated to the agent 36 are set forth in Table 13 of the Data Model Application. The variables within Table 13 of the data model application, refer to identification numbers of various other roles, such as device pool roles, account roles, and application roles. The communication gateway 38 requests the units associated with each of the device pool roles, account roles, and application roles referenced in the device roles table.

Upon acquiring the identification number of each of the device pool, account, and application roles, the communication gateway 38 then queries the tables relating each of these roles to obtain the identification number of the software units contained therein. In the Data Model Application, these tables are Tables 8, 7, and 4, respectively. Within each of these tables, an identification number of each unit associated with the respective roles is represented.

Upon acquiring the identification number of each of the software units associated with the device role, or the roles related thereto (i.e., the device pool role, the account role, and the application role) the communication gateway 38 then returns the union of all unit identification numbers obtained in the query, along with the variable indicating the units' location within the central file system 34, which is obtained in Table 1 of the Data Model Application. The agent receives the unit location from the communication gateway 38, and attempts to retrieve the software units from the central file system 34. To do this, the agent 36 provides the file server 35 with the unit location of each of the software units desired from the central system 34.

Upon receiving the request from the agent 36, the central file system 34 examines the source IP address of the Device 1 upon which the agent 36 resides to determine if the agent 36 is authorized to retrieve the desired software units. In making this determination, the central file system 34 requests that the communication gateway 38 query the central database 32 regarding the IP address of the Device 1 upon which the agent 36 resides. The ultimate determination of whether of not the agent 36 is authorized to access the requested software units may be based on a variety of factors, such as customer account access limitations, software compatibility, and the like.

In the case that authorization is determined according to account restrictions, a number of tables from the central database 32 are queried to determine if the IP address of the Device 1, upon which the agent 36 resides, belongs to a customer account which is authorized to access a requested software units from the central file system 34. In making this determination, first Table 81 of the Data Model Application is queried which contains the IP addresses of the various devices on the network. These IP addresses may be separated into various VLANs, which are related customer service tiers. Multiple customer tiers are then related to specific customer accounts. Thus, the communication gateway 38 then can query the central database 32 to determine the account of an IP address by querying the tables of the Data Model Application to obtain the VLAN pool identification number associated with the IP address of the Device 1. Then the VLAN IP pools Table 77 of the Data Model Application is queried to determine the VLAN compartment identification number corresponding to the IP address. Once the VLAN compartment identification number has been determined, the system may then query the VLAN compartment Table 73 of the Data Model Application to determine the customer tier identification number associated with the IP address. Once the customer tier identification number has been determined, the account identification number associated with the IP address may be looked up in the customer tiers Table 70, whereupon the accounts Table 67 may be looked up to determine the units associated therewith.

If the communication gateway 38 queries the central database 32 and discovers that the IP address in the units request communication (e.g., in the IP packet header) does not exist within the IP address Table 81, then the file server 35 and the central file system 34 will refuse to provide the agent 36 with the requested software units. If, on the other hand, the access of the agent 36 is verified by way of the IP address of the Device 1 on which the agent 36 resides, the central file system then provides the agent 36 with all of the software units requested by the agent 36 to which the agent has access.

The procedure described above relates to verifying the access of a requesting agent to receive specific software packages. However, those skilled in the art would recognize that additional information could be obtained by way of the communication gateway 38 from the central database 32 using the database data model provided in the Data Model Application. Such information may include, for example, determinations regarding software compatibility of applications to be installed on devices with other applications on the devices, hardware configurations of the devices, compatibility of hardware configurations of the device with the software to be installed thereon, and the like. Additionally, device authorizations and access control lists (ACLs) may be queried to determine if a device has access to specific software units. The software units may be provided in bundles from the central file system 34 along with additional instructions for installing the software units on hardware devices. Additionally, those skilled in the art will recognize that the trust hierarchy 37 would be used to provide any of the authorization or access control information of the present invention.

Figure 11:
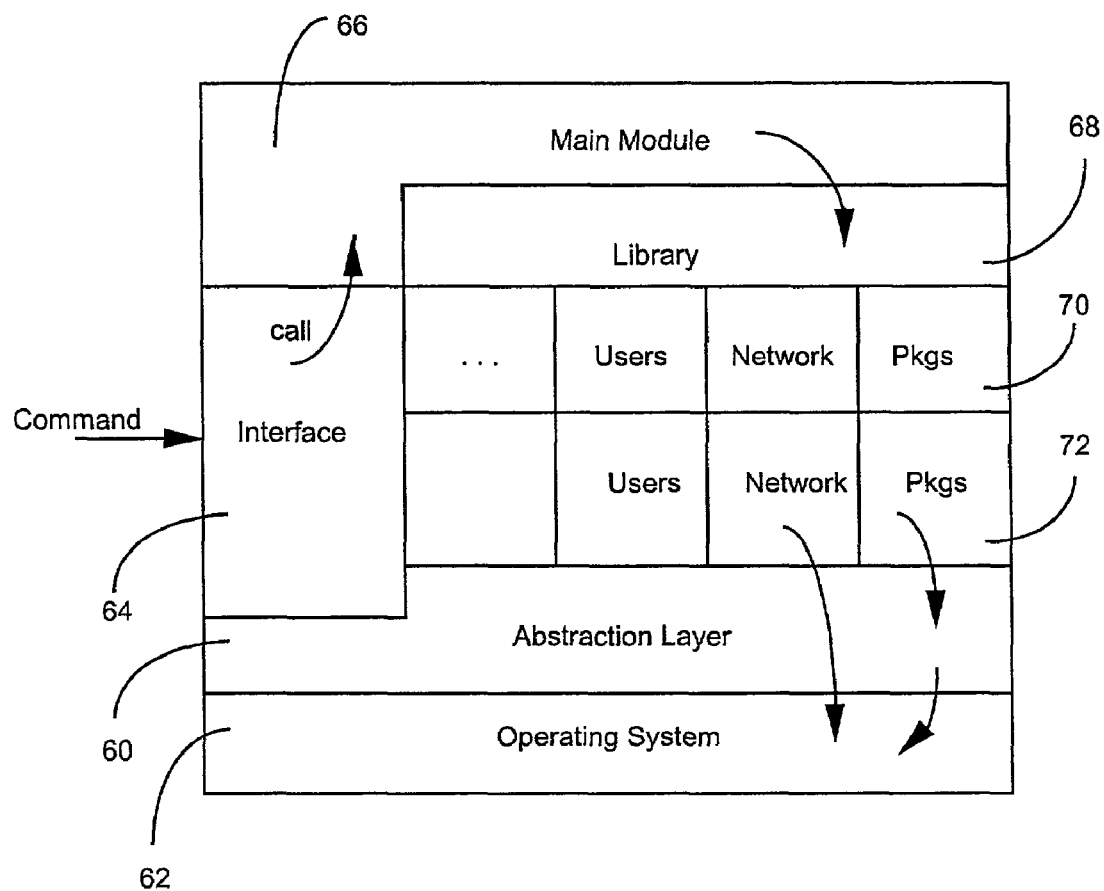
FIG. 11 is a block diagram of the components of the agent.

FIG. 11 illustrates one example of the structure of the agents 36. A first layer of the agent comprises an abstraction layer 60 which communicates with the operating system 62 for the device of interest. If this abstraction layer is written in a language such as Python, for example, it provides multi-platform capabilities, enabling the same agent to be used with many different types of operating systems. In essence, this layer provides functionality analogous to that of a virtual machine for interpreted bytecode languages, such as Java.

Another component of the agent is a communications interface 64 which accepts connections from the gateway 38 and other trusted sources. In response to a command received from the gateway, the interface 64 makes a call to a main module 66. This module, in turn, makes a call to an agent library 68. This library contains a number of components 70 that relate to the different functions that are performed by the agent, such as load packages, establish a network connection, etc. These components 70 are generic to all operating systems. Plug-in modules 72 which are specific to the particular operating system 62 are associated with the library components 70. These plug-in modules communicate with the abstraction layer 60 to cause specific actions to be performed by the operating system. In some cases, the plug-in modules may have the capability to communicate directly with the operating system 62, in which case they can bypass the abstraction layer.

The foregoing description has been provided in the context of one provisioning network that may be used to control devices at one data center. It will be appreciated that such a network can be a subnetwork in a wide-area network which controls devices at several data centers. In such an embodiment, the communication gateways in each subnetwork can exchange information with one another regarding the data stored in their respective database systems 32 and/or software packages in their file systems 34. Hence, if an entity has its web site infrastructure apportioned over several data centers, the provisioning operations can be coordinated amongst the various centers.

From the foregoing, therefore, it can be seen that the present invention provides a framework for the automated provisioning of devices which constitute the infrastructure of a web site, such as servers. Two significant features of this framework are its flexibility and the repeatability of the results that are obtained. The flexibility permits the varied needs of different web sites to be readily accommodated, and thereby avoids the limitation of having to configure the architecture of every site the same way. The repeatability ensures that every server will have the proper set of software components once it has been provisioned, and thereby be ready to operate immediately. In addition to these features, the automated provisioning that is provided through this system achieves a significant time savings, enabling the entire process to be accomplished in substantially less time than is required for manual provisioning.

It will be appreciated by those of ordinary skill in the art that the present invention can be embodied in other forms without departing from the spirit or essential characteristics thereof. For instance, while an exemplary embodiment of the invention has been described in the context of provisioning web site servers in a data center, it will be appreciated that the principles underlying the invention can be applied in any environment where computing devices need to be configured and/or updated on a relatively large scale. The foregoing description is therefore considered to be illustrative, and not restrictive. The scope of the invention is indicated by the following claims, and all changes that come within the meaning and range of equivalents are therefore intended to be embraced therein.

What is claimed is:

1. A method for executing commands in a system having a database, a plurality of devices remote from the database and a gateway that provides a communications interface between said remote devices and said database, comprising the following steps:

storing a queue in said database containing a sequence of commands to be executed;

retrieving, at said gateway, a command from the queue and transmitting the retrieved command from the gateway to an agent running on at least one of said remote devices, for execution on said one device;

at said gateway, receiving a message from the agent reporting the results of the execution of the command;

retrieving, at said gateway, the next command from the queue in response to receipt of said message, and transmitting said retrieved next command to the agent for execution;

in response to receiving a message at the gateway from the agent reporting the results of the execution of at least one command, transmitting a command from the gateway to the agent on the remote device to initiate a reboot process;

placing the queue in a reboot status in response to the initiation of the reboot process;

retrieving at the gateway a message from the agent indicating the completion of the reboot process at the remote device;

removing the queue from reboot status in response to said message, and checking at the gateway whether any commands remain in the queue that have not yet been completed; and resuming the step of retrieving commands in the queue and transmitting them to the agent if uncompleted commands are determined to be present in the queue.

2. The method of claim 1, wherein said queue is placed in said reboot status in response to receipt at said gateway of a message from the agent on the remote device indicating that the reboot process is in progress.

3. The method of claim 2, wherein said agent opens a new communication session with said gateway to transmit said message.

4. The method of claim 3, wherein said new communication session comprises a secure socket.

5. The method of claim 1, further including the step of updating the status of the queue to indicate the command that has been most recently transmitted to the agent for execution.

6. The method of claim 1, wherein said sequence of commands cause the agent to install and configure software on the remote device.

7. The method of claim 1, wherein said message indicating the completion of the reboot process at the remote device includes a report of the configuration of the remote device.

* * * * *